US006981828B2

(12) United States Patent
Davies et al.

(10) Patent No.: US 6,981,828 B2
(45) Date of Patent: Jan. 3, 2006

(54) CONTAINER FOR SECURE TRANSPORT OF CARGO

(75) Inventors: Larry A. Davies, Tallmadge, OH (US); Ferenc M. Relle, Jr., Wooster, OH (US)

(73) Assignee: Roadway Express, Inc., Akron, OH (US)

( * ) Notice: Subject to any disclaimer, the term of this patent is extended or adjusted under 35 U.S.C. 154(b) by 0 days.

(21) Appl. No.: 10/677,998

(22) Filed: Oct. 2, 2003

(65) Prior Publication Data

US 2005/0074310 A1 Apr. 7, 2005

(51) Int. Cl.
*B61D 45/00* (2006.01)

(52) U.S. Cl. .................................... 410/141; 410/144

(58) Field of Classification Search ................ 410/141, 410/140, 129, 121, 143, 144, 117, 118
See application file for complete search history.

(56) References Cited

U.S. PATENT DOCUMENTS

| | | | | | |
|---|---|---|---|---|---|
| 1,052,747 | A | * | 2/1913 | Page | 410/141 |
| 2,071,802 | A | * | 2/1937 | Sweeley et al. | 410/132 |
| 2,091,869 | A | * | 8/1937 | McCurdy | 410/141 |
| 2,424,070 | A | * | 7/1947 | Welsh | 410/142 |
| 2,989,011 | A | * | 6/1961 | Hendrikson | 410/140 |
| 3,486,468 | A | * | 12/1969 | McLaughlin et al. | 410/141 |
| 3,782,758 | A | * | 1/1974 | Williamson, III | 410/118 |
| 4,049,311 | A | * | 9/1977 | Dietrich et al. | 410/138 |
| 4,080,906 | A | | 3/1978 | Brown | |
| 4,743,151 | A | * | 5/1988 | Haberkorn | 410/121 |
| 4,880,342 | A | | 11/1989 | Pradovic | |
| 5,009,564 | A | | 4/1991 | Lutz et al. | |
| 5,143,508 | A | | 9/1992 | Lutz et al. | |
| 5,219,251 | A | | 6/1993 | Kanczuzewski | |
| 5,314,290 | A | | 5/1994 | Lutz et al. | |
| 5,472,301 | A | * | 12/1995 | Wallen | 410/151 |
| 5,577,449 | A | | 11/1996 | Kleiner et al. | |
| 5,706,964 | A | | 1/1998 | Podd et al. | |
| 5,984,601 | A | | 11/1999 | Jevaney et al. | |
| 6,057,779 | A | | 5/2000 | Bates | |
| 6,086,299 | A | | 7/2000 | Kanczuzewski | |
| 6,206,623 | B1 | | 3/2001 | Podd | |
| 6,261,038 | B1 | * | 7/2001 | Cowan | 410/94 |
| 6,357,979 | B1 | | 3/2002 | Montagna et al. | |
| 6,406,232 | B1 | * | 6/2002 | Snitker et al. | 410/142 |
| 6,419,301 | B1 | | 7/2002 | Tuerk | |
| 6,431,804 | B1 | * | 8/2002 | Wetzig, III | 410/94 |
| 6,510,807 | B2 | | 1/2003 | Gottfried | |
| 6,514,022 | B2 | * | 2/2003 | Truckor et al. | 410/138 |
| 6,527,487 | B2 | | 3/2003 | Adams | |
| 6,546,887 | B2 | | 4/2003 | Kennedy | |
| 6,742,975 | B2 | * | 6/2004 | Trine et al. | 410/151 |
| 2003/0231938 | A1 | * | 12/2003 | Williams | 410/130 |

* cited by examiner

*Primary Examiner*—H. Gutman
(74) *Attorney, Agent, or Firm*—Calfee, Halter & Griswold LLP

(57) ABSTRACT

A temporary, secured divider is provided to partition a cargo container into a secured compartment and a non-secured compartment, allowing for the secured transport of cargo that does not occupy the entire container. Also provided is a container for such secured transportation and methods and systems of secured transportation of a partial cargo load.

14 Claims, 8 Drawing Sheets

CONTAINER FOR SECURE TRANSPORT OF CARGO

BACKGROUND

The present invention relates to a cargo container, and, more particularly, to a cargo container divided to provide a secured compartment.

Conventional cargo containers, such as trailers for tractor-trailer vehicles, are typically filled with cargo for single destination. If the cargo container is to contain cargo for multiple destinations, the cargo is often co-mingled or conventional movable bulkheads installed to separate the cargo.

For some cargos, it is desired to provide security so that the cargo is not lost, stolen, or vandalized, etc. Sometimes, the nature of the cargo is to remain confidential, requiring security. Also, some government regulations require special documentation and security for selected cargo to document handling procedures. Sometimes, there is damage to cargo by multiple handling and transfers typical on long haul transportation. In these and other situations for which security is required for the cargo, conventionally the entire cargo container is locked to provide the required security.

If the cargo to be transported under secure conditions does not fill the selected cargo container, then space within the cargo container is not fully utilized because the entire container must be locked to provide the required security for the cargo. Moreover, customers may be charged for the use of space not constructively used.

SUMMARY OF THE INVENTION

The present invention provides a container for transporting cargo. The container has first and second opposing, essentially parallel walls, and a bottom and a top extending between and essentially perpendicularly to the first and second walls. Part of the container is secured for secure transport of selected cargo, while the remainder of the container is available for other secured or non-secured cargo. This is accomplished by providing a securable, temporary, removable divider within the container that separates the container into at least a first compartment and a second compartment. The divider is lockable such that cargo may be placed into the first compartment and the removable divider installed and locked to provide security for the cargo in the first compartment. Other cargo, whether secured or non-secured, may be placed into the second compartment and the remainder of the container. The non-secured cargo may then be transported to a destination, removed, and the secured cargo continue to its destination without underutilizing the available space in the container due to securing the entire container to provide security for the secured cargo.

The temporary divider is installed by constructing a base unit configured with a groove to receive a bulkhead and to rest on the bottom of the container. The bulkhead is configured to rest in the base groove and to extend essentially from the first wall to the second wall of the container and essentially from the container top to the container base. The bulkhead is held in place by at least one removable first bar extending from the first wall of the container to the second wall of the container adjacent or very close to a first side of the bulkhead and at least one removable second bar extending from the first wall of the container to the second wall of the container adjacent or very close to a second side of the bulkhead, opposite of the first side of the bulkhead. These bars support the bulkhead and prevent substantial movement of the bulkhead when the container is being transported. Preferably, both bars are adjacent to the bulkhead on opposite sides.

A lock cooperates with the at least one second bar to secure the second bar in place in the container such that the second bar and the bulkhead may not be removed to provide unauthorized access to the cargo in the first compartment.

The invention also includes the lockable divider, a method for constructing the lockable divider, and methods for secure transport of cargo.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention, wherein.

DETAILED DESCRIPTION OF THE INVENTION

The present invention is directed to a container for secure transportation of cargo in which the secured cargo does not require use of the entire container. The invention is applicable to any transportation container, including a trailer, a rail car, an air cargo hold, a boat cargo hold, or a cargo container for air transport, ocean transport, road transport, or rail transport, or transport by any other vehicle or manner. The transportation container may be placed into another transportation container, such as a container placed into a cargo hold, of the container may be the cargo hold itself. The invention will be described in an exemplary manner as it relates to a trailer for use in a tractor-trailer vehicle combination for over-the-road transportation.

Figure 1:
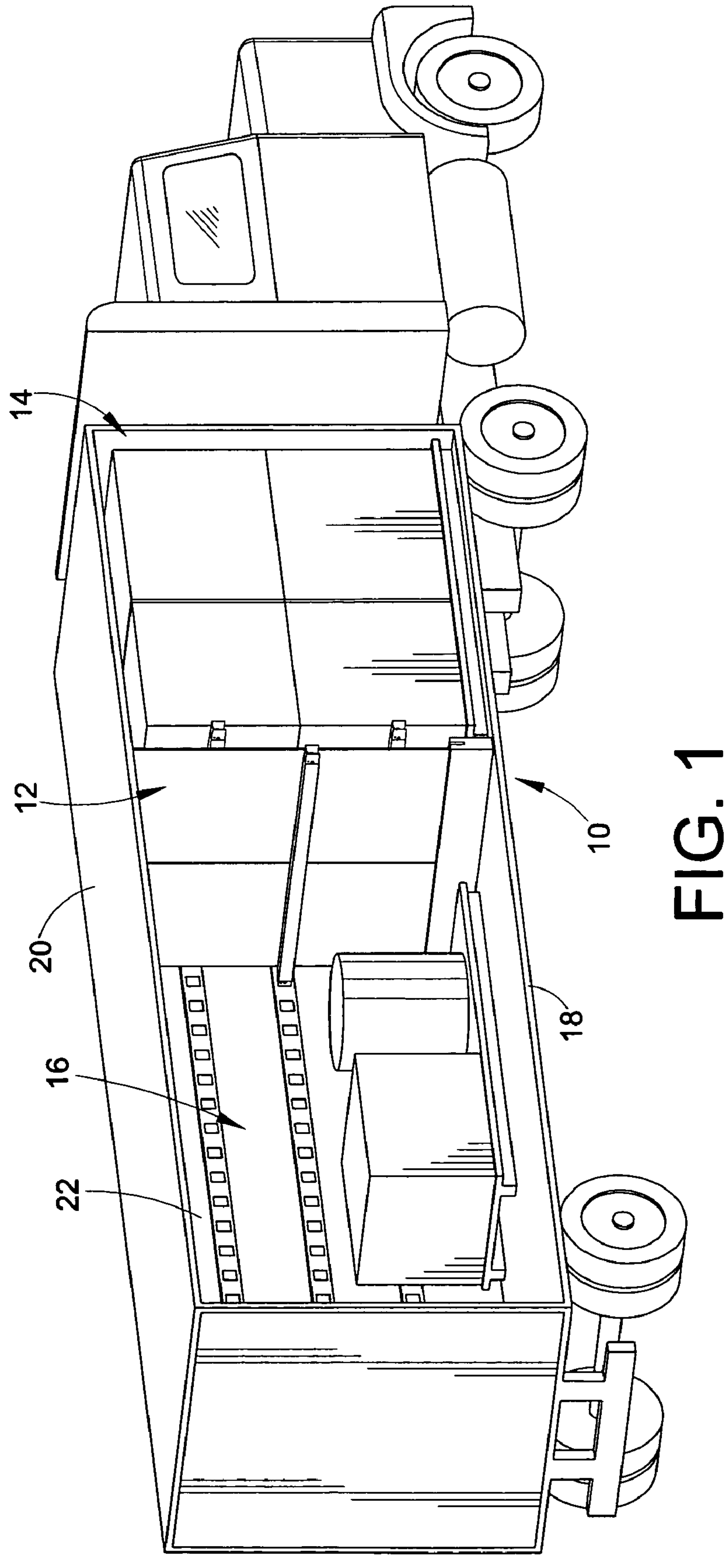
FIG. 1 is a perspective view of a container in accordance with the present invention.

FIG. 1 illustrates an embodiment of the present invention in which a container 10 has a secured divider 12 separating the container 10 into a first secured compartment 14 and a second non-secured compartment 16. In this embodiment, the container is a trailer for a tractor-trailer transportation combination.

The secured divider 12 extends from a bottom 18 of the container to a top 20 of the container and from a first wall 22 of the container to a second wall 24 of the container. The secured divider 12 may abut these surfaces, or may be up to a few inches away from these surfaces.

Figure 2:
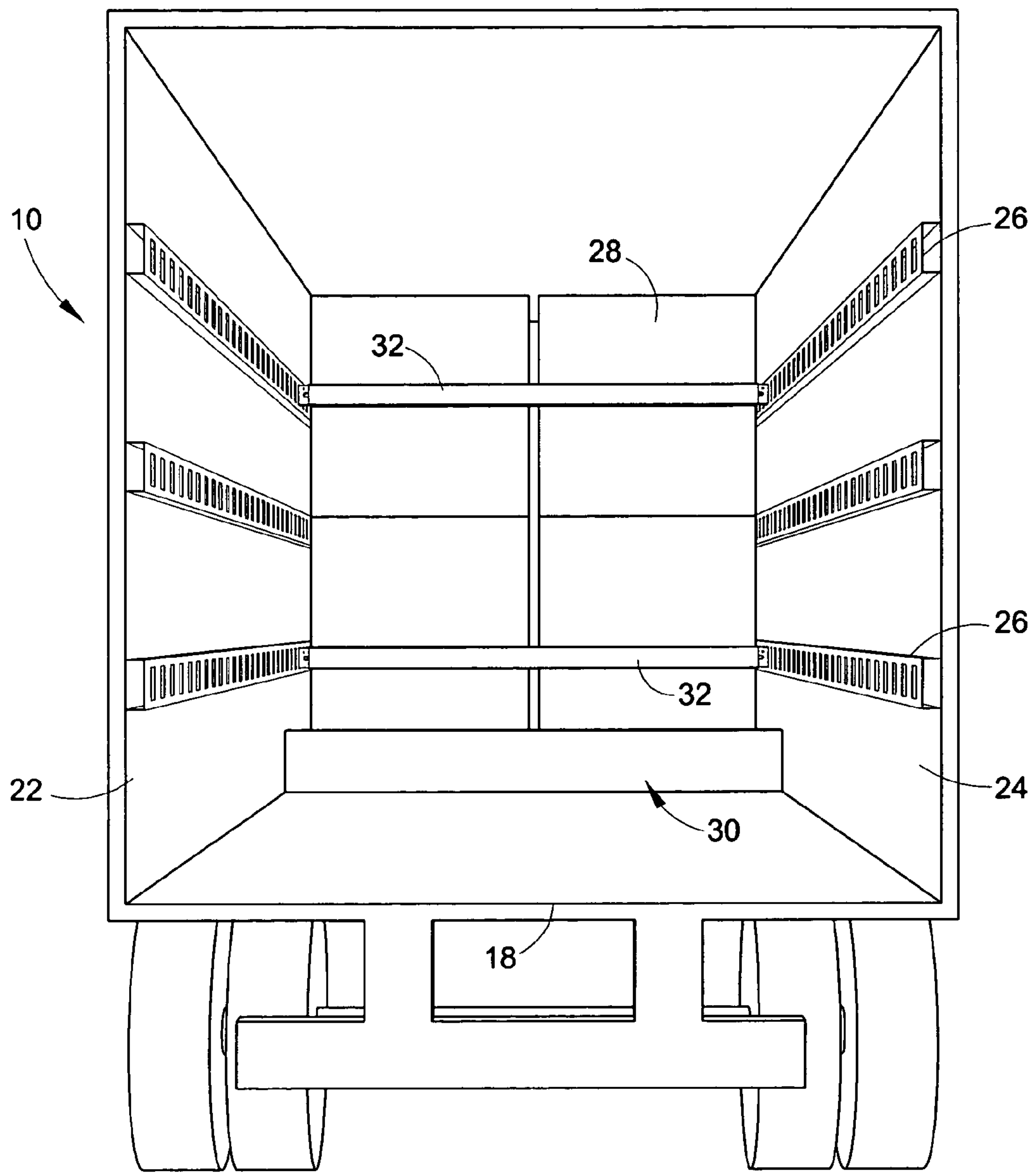
FIG. 2 is an elevational view of the interior of a container in accordance with the present invention.

FIG. 2 illustrates an interior of the container 10. In this embodiment, the container 10 is a deck trailer having three horizontal E-track channels 26 extending along the first wall 22 and the second wall 24. The secured divider 12 includes a base 30 adjacent the bottom 18 of the container and first bars 32 releaseably engaged with the E-track channels 26 on the first wall 22 and the second wall 24. Secured cargo 28 is placed into the container 10 prior to erecting the secured divider 12. The secured cargo 28 must generally be properly blocked and braced, regardless of the positioning of the secured divider 12.

Figure 3:
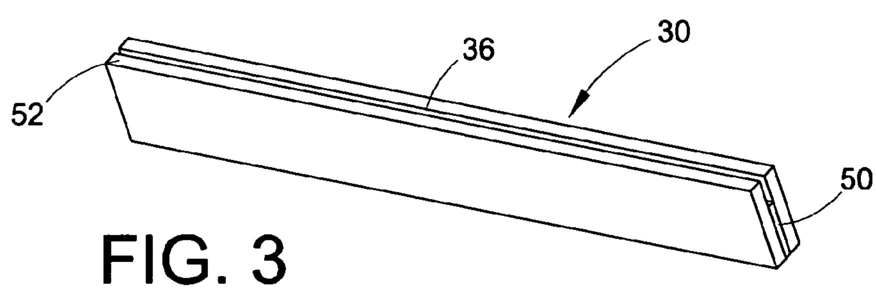
FIG. 3 is a perspective view of a base portion of the divider in accordance with the present invention.

FIG. 3 illustrates the base 30 having a groove 36.

Figure 4:
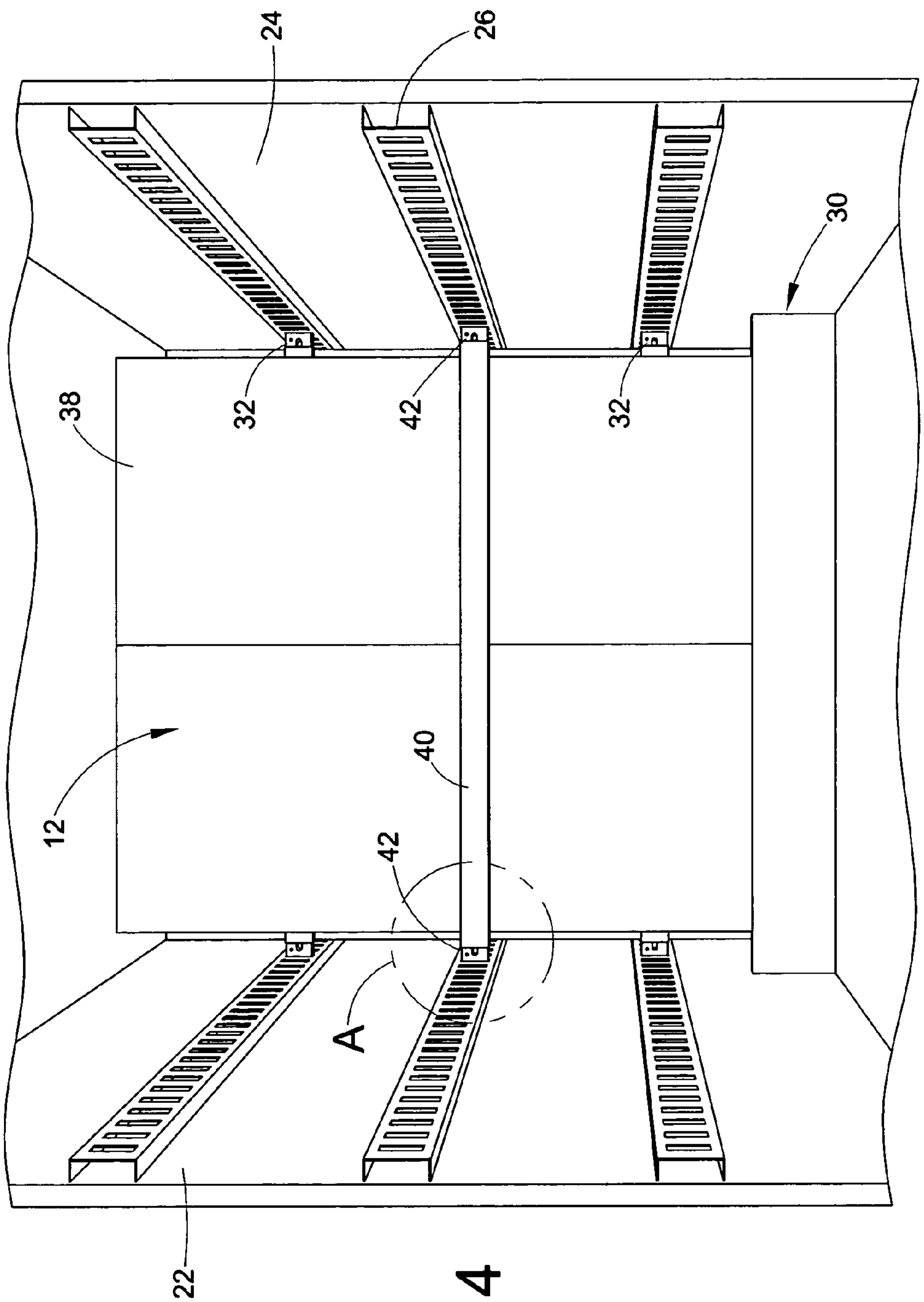
FIG. 4 is a perspective view of the interior of a container in accordance with the present invention.
Figure 5A:
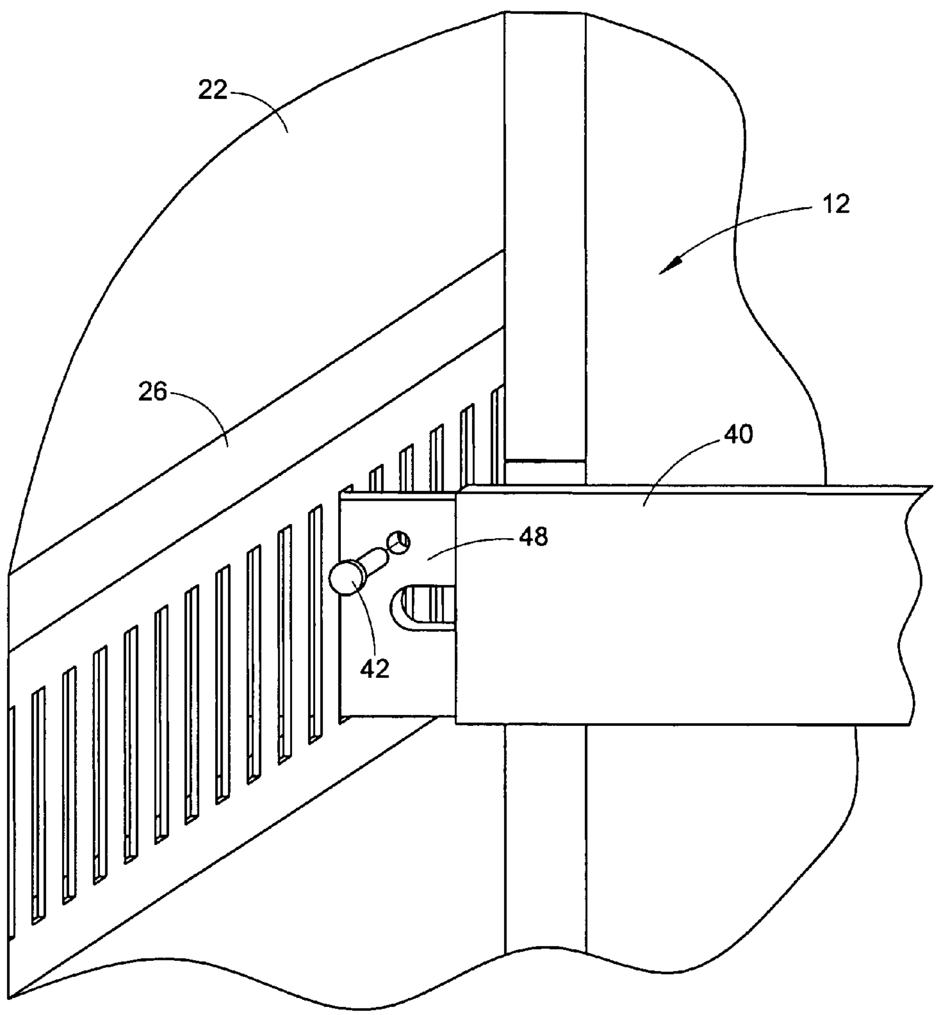
FIGS. 5A, 5B, 5C, and 5D are detailed illustrations of different embodiments of the area A indicated on FIG. 4.
Figure 5B:
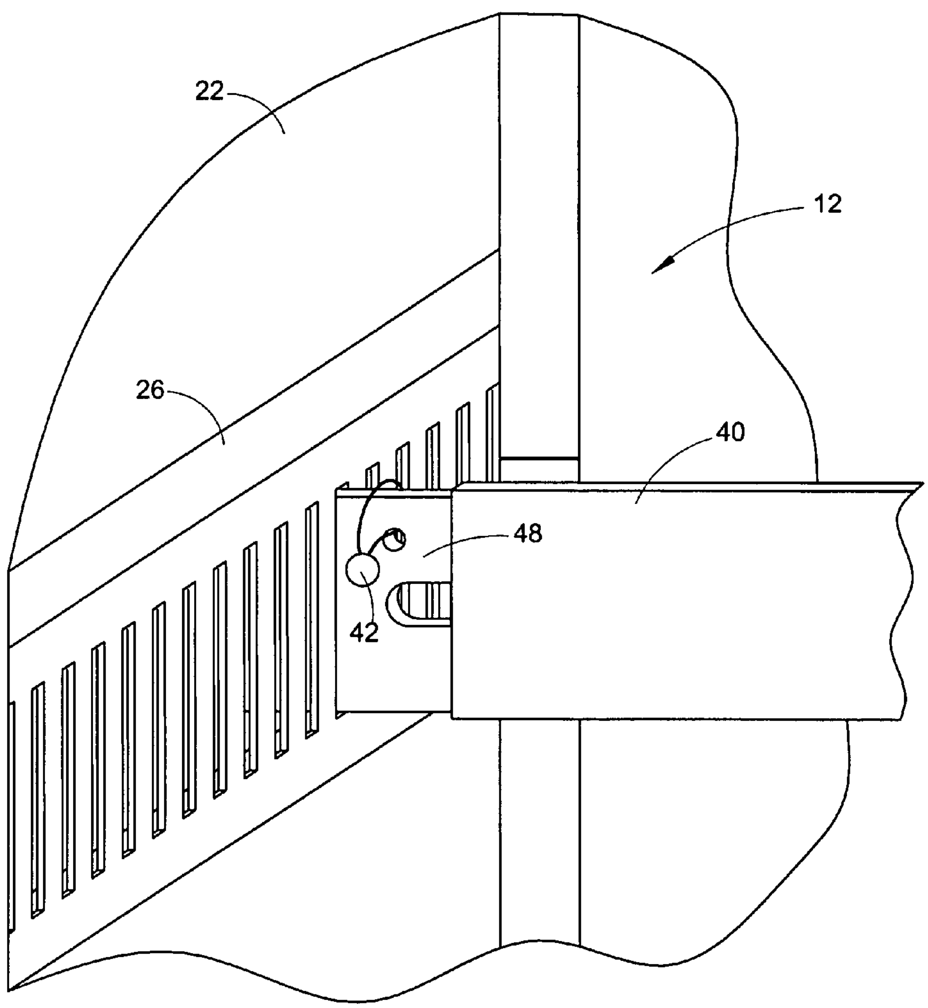
Figure 5C:
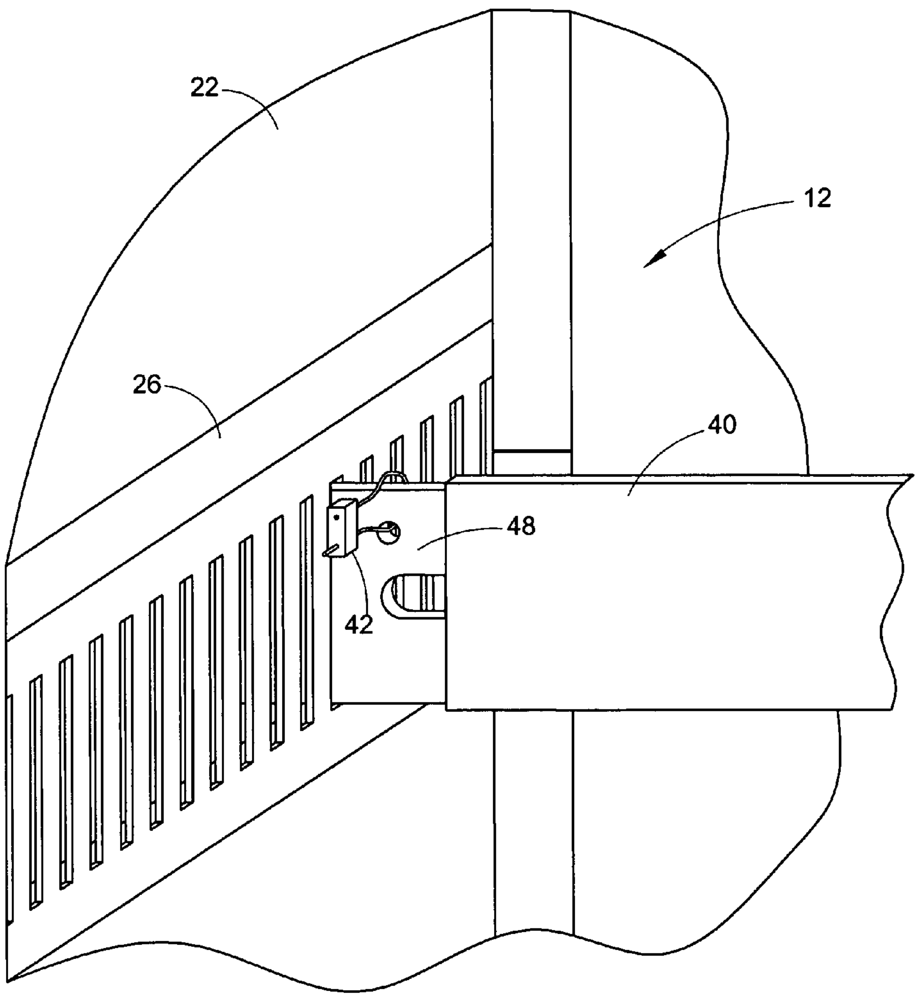
Figure 5D:
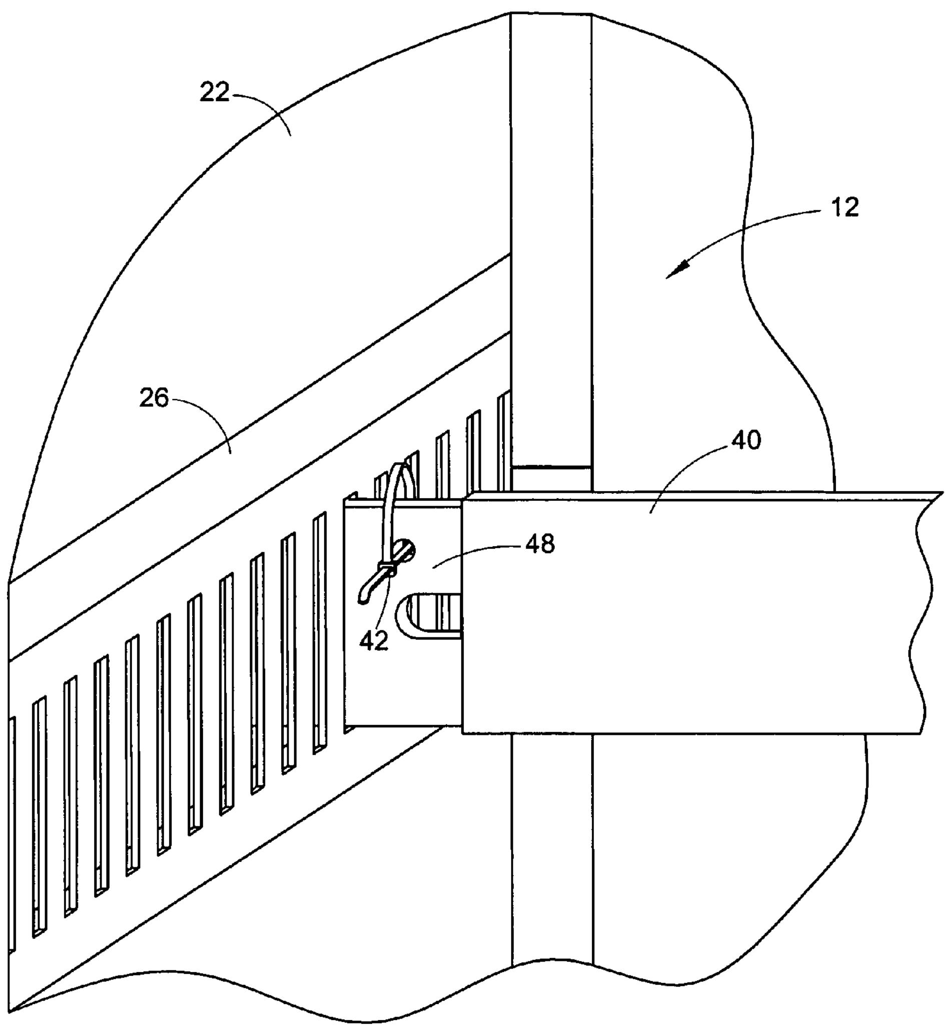

FIG. 4 illustrates the secured divider 12 with a bulkhead 38 inserted into the groove 36 of the base 30 and a second bar 40 releaseably engaged in the E-track channels 26 on the first wall 22 and the second wall 24 on an opposite side of the bulkhead 38 from the first bars 32. The second bar 40 is secured and prevented from removal by one or more locks 42.

FIG. 5 is a detailed view of a portion of FIG. 4, illustrating a lock 42 engaged with the second bar 40 to prevent its removal from the E-track channel 26.

Figure 6:
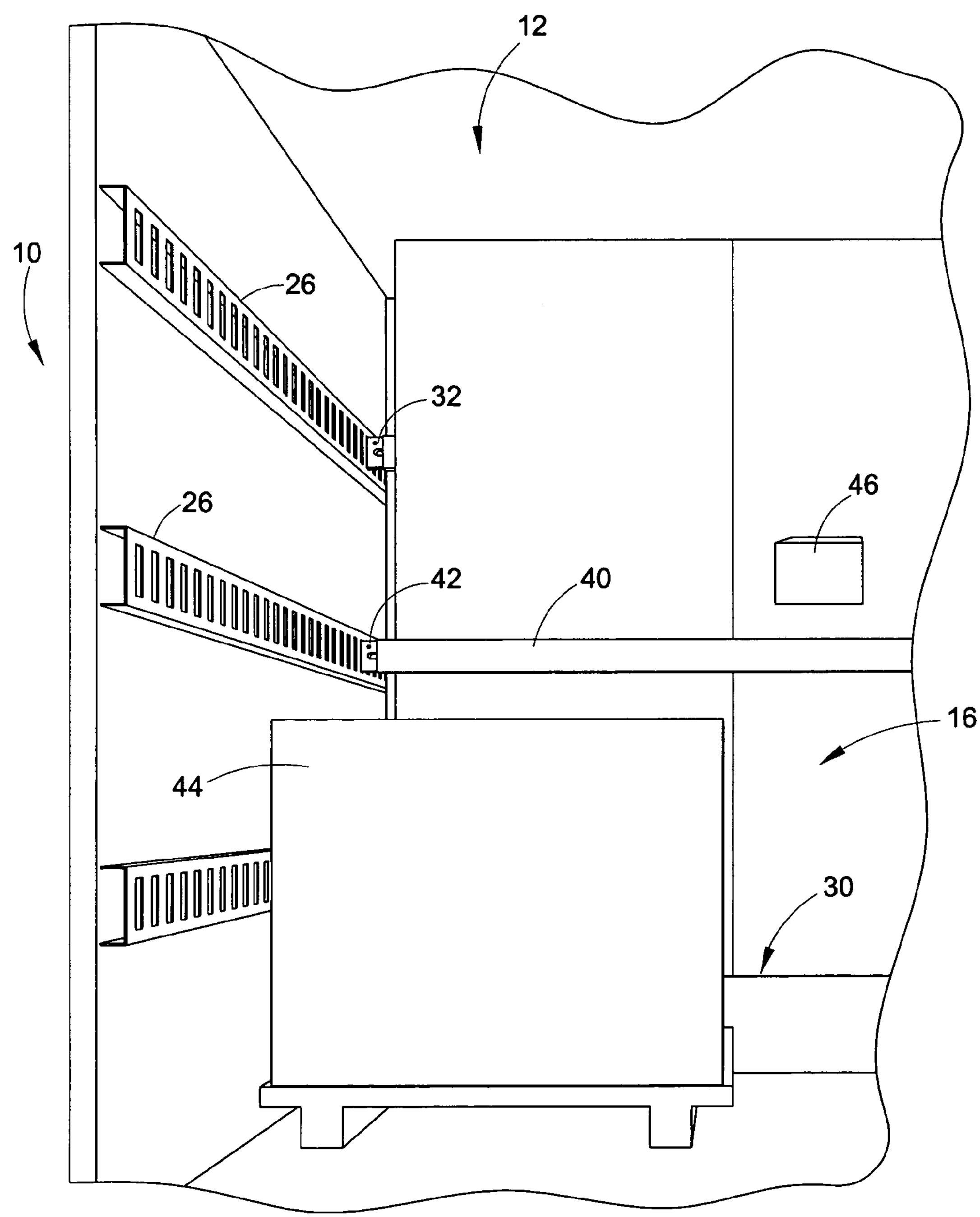
FIG. 6 is a perspective view of the interior of a container with a secured divider in accordance with the present invention.

FIG. 6 illustrates the secured divider 12 in place to secure the secured cargo 28 (not illustrated in this Figure) and secured by locks 42. Non-secured cargo 44 may be placed in the non-secured compartment 16 after assembly of the secured divider 12 in the container 10. Notification 46 is placed on the sealed secured divider 12 to provide information about the secured cargo 28, the secured divider 12, the origin and destination of the secured cargo 28, serial numbers of the locks 42, and any other information desired.

In a preferred embodiment, the E-track channels 26 are standard E-track channels found on conventional deck trailers. Other channels, rails, etc. may be used to secure the first bars 32 and the second bar 40 to the first wall 22 and the second wall 24, such as A-track, S-track, F-track, or any horizontal rail having slots disposed thereon to enable engagement with the first bar 32 and second bars 40. The rail/track need not be disposed horizontally, but horizontal disposition provides greater flexibility in placement of the secured divider 12. Alternatively, the manner of engagement of the bars 32, 40 may be integral with the first wall 22 and the second wall 24. The engagement of the bars 32, 40 with the first wall 22 and the second wall 24 may be made in any conventional manner without departing from the spirit and scope of the invention, except as further described herein.

The first bars 32 and the second bar 40 are, preferably, deck bars having an extendable portion 48 designed to interlock with openings in the E-track channels 26 to extend across the width of the container 10. Except as described below, the deck bars are conventional deck bars. Any number of first bars 32 and second bars 40 may be used. Preferably, there are two first bars 32 disposed on a first side of the secured divider 12 toward the secured cargo 28 and one second bar 40 disposed on a second side of the secured divider 12 toward the non-secured cargo 44.

The locks 42 may be of any design suitable to prevent removal of the second bar 40 and subsequent removal of the bulkhead 38 to prevent unauthorized access to the secured cargo 28 in the first, secured compartment 14. As discussed above, there may be space between the secured divider 12 and the walls 22, 24 and/or bottom 18 and top 20, but this space is insufficient to allow access to the secured cargo 28 in the first, secured compartment 14. Alternatively, the secured divider 12 may fit flush against these surfaces such that there is no space between these surfaces and the secured divider 12.

In a preferred embodiment the locks 42 are rod locks, each having a unique serial number associated therewith, that can only be destructively removed, such as by bolt cutters. A first rod lock 42 is placed in cooperation with second bar 40, preferably near where the extendable portion 48 attaches to the E-track channel 26 on the first wall 22, and a second rod lock 42 is placed in cooperation with the second bar 40, preferably near where the extendable portion 48 attaches to the E-track channel 26 on the second wall 24.

The extendable portion 48 is locked with the rod lock 42 to prevent removal of the second bar 40. This may be accomplished by drilling a hole in the extendable portion 48 such that the rod lock 42 may be placed therethrough to secure the second bar 40. Other varieties of locks, such as a padlock, a combination lock, cable ties, cable seals, bolt seals, lead and wire seals, or any other lock or seal, may be used without departing from the spirit or scope of the invention. The lock 42 is placed to prevent removal of the second bar 40 and the bulkhead 38 to prevent unauthorized access to the secured cargo 28 in the first, secured compartment 14. The lock 42 need not cooperate with the extendable portion 48 of the second bar 40, nor is the second bar 40 required to have an extendable portion 48. The lock 42, however, must cooperate with the second bar 40 to prevent removal of the second bar 40 without first removing the lock 42.

FIG. 3 illustrates a preferred embodiment of the base 30 in which a first board 50 is secured between two second boards 52. The first board 50 has a width less than the width of the second boards 52, such that when they are secured together with the first board 50 sandwiched between the second boards 52, a groove 36 is created capable of receiving bulkhead 38. The first board 50 and the second boards 52 may be secured in any conventional manner, such as with nails, screws, brads, rivets, staples, adhesive, or any other method of securing without departing from the spirit or scope of the invention. A base 30 is not required for the secured divider 12, but, preferably, such a base 30 is provided. Preferably, the dimensions of the first board 50 are 1 inch×8 inches×8 feet and the dimensions of the second boards 52 are 2 inches×12 inches×8 feet. Preferably, the boards 50, 52 are secured by four four-inch self-tapping screws.

To construct the secured divider 12, the base 30 is constructed as described above. The secured cargo 28 is loaded into the container 10 prior to constructing the secured divider 12. The linear space occupied by the secured cargo 28 is measured such as with a tape measure or by any other conventional manner of measuring the linear feet of the space occupied by the secured cargo 28. Preferably, this measurement begins at one end of the container 12 and extends axially in container 12 to the place at which the secured divider 10 is to be constructed. The linear feet occupied by the secured cargo is then recorded.

At least one first bar 32 is attached to the first wall 22 and the second wall 24. In a preferred embodiment, the first bar 32 is a conventional deck bar and is attached to an E-track channel 26 extending along the first wall 22 and the second wall 24, as described above. As illustrated in FIG. 2, in a preferred embodiment there are two first bars 32 attached to the E-track channels 26 in the first wall 22 and the second wall 24. In a container not having E-track channels 26, the first bar 32 may be attached to the first wall 22 and the second wall 24 in any conventional manner without departing from the spirit and scope of the invention. Also, any number of first bars 32 may be placed across the width of the container 10 and attached to the first wall 22 and the second wall 24.

The base 30 may be constructed prior to attaching the first bar 32 to the first wall 22 and the second wall 24 or after such attachment. The base 30 may be constructed before or after loading of the secured cargo 28 into the container 10. However, it is preferred that the secured cargo 28 be loaded into the container 10 prior to attaching the first bar 32 to the first wall 22 and the second wall 24. Before or after the attachment of the first bar 32 to the first wall 22 and the second 24, but after loading the secured cargo 28, the base 30 is placed on the bottom 18 of the container near the vertical plane in which the first bar 32 is disposed.

The bulkhead 38 is then placed in the groove 36 of the base 30 such that the first side of the bulkhead 38 is abutting or near the first bar 32. Preferably, the bulkhead 38 includes two pieces of plywood, each placed into the groove 36 of the base 30, and they may be interlocked together. Most preferably, the dimensions of the plywood is 4 feet×8 feet×5⁄8 inch.

After placement of the bulkhead 38 in the groove 36 of the base 30, the bulkhead 38 is preferably fastened to the base 30 by use of nails, screws, brads, rivets, staples, adhesives, or any other securing method without departing from the spirit or scope of the invention. This may be done at any time after the bulkhead 38 is placed into the groove 36 of the base 30. Preferably, a portion of the nails are left exposed to more easily permit removal of the nails at the destination. Preferably, the nails are conventional 4-inch common nails.

After placement of the bulkhead 38 into the groove 36 of the base 30, the second bar 40 is attached to the first wall 22 and to the second wall 24 abutting or near the second side of the bulkhead 38, opposite the first bar 32. As with the first bar 32, the second bar 30 is preferably attached to the first wall 22 and the second wall 24 by use of E-track channels 26. The second bar 40 is preferably placed adjacent to and abutting the bulkhead 38, but location of slots in the E-track channels 26 may not allow placement of the second bar 40 adjacent to the bulkhead 38. The second bar 40 is placed near enough to the bulkhead 38 to prevent removal of the bulkhead 38 and unauthorized access to the secured cargo 28 in the first, secured compartment 14. As with the first bar 32, any number of bars may be used. Preferably, there is a single second bar 40. After placement of the second bar 40, it is locked with the lock 42 to prevent removal of the second bar 40.

The serial number or other identifying information associated with the locks 42 are recorded such that when the secured cargo 28 arrives at its destination, the consignee may verify that the locks 42 in place upon arrival of the shipment are the same locks that were placed at the destination of the shipment. This guarantees that the locks have not been changed. By use of locks that must be destroyed to remove, such as rod locks, cable ties, cable seals, bolt seals, lead and wire seals, etc., the presence of the identical lock upon arrival at the destination also ensures that the locks have not been removed and that the secured cargo 28 has not been tampered with.

The identifying information of the locks, such as the serial number, is placed on a notification 46 that is affixed to the bulkhead, as illustrated in FIG. 6. The notification 46 may also contain information such as the consignor, the consignee, the linear footage of the secured cargo 28, the destination, the origin, and any other information desired.

A consignor requests that cargo be transported from an origin to a destination in a secured manner and then delivered to a consignee. Conventionally, charges for shipment of cargo are based upon the weight of the cargo and the distance that the cargo must be shipped. Charges for shipment of secured cargo conventionally are for the entire container, because the entire container must be secured/locked to provide shipment of the secured cargo.

In a preferred embodiment of the present invention, the charge for shipping the secured cargo 28 is based upon the linear feet occupied by the secured cargo 28 as described above, and the distance which the secured cargo 28 is to be shipped. In this way, a consignor pays only for the actual space used when transporting secured cargo instead of the entire container that is to be secured, as is the conventional manner of payment.

In the manner described above, several secured dividers 12 may be assembled and installed in a single container 10 to provide security for secured cargo 28 from multiple consignors or that have multiple destinations. Logistics, such as the order of loading and unloading of the cargo, may be determined on a case-by-case basis by one of ordinary skill in the art.

Once the secured divider is installed, non-secured cargo 44 may be loaded into the available space in the container 10, and the consignors of the non-secured cargo are charged for shipment in a conventional manner. This improves the utilization of the space in the container 10 by providing a secured compartment 14 for transportation of secured cargo 28 and a non-secured compartment 16 for transportation of non-secured cargo 44 that does not require the security of the secured cargo 28.

In transit, the secured cargo 28 is not transferred to another container and does not co-mingle with any other secured cargo 28 or non-secured cargo 44, although the container 10 itself may be transferred, such as from boat to trailer. The secured cargo 28 is not accessed during transit.

Upon arrival at the destination for the secured cargo 28, the consignee or its representative verifies that the lock 42 is the same as the lock 42 installed at the origin, such as by verifying the recorded serial number. Then the secured divider 12 is disassembled, providing access to the secured cargo 28 for its removal from the container 10. This requires removal of the lock 42. In the case of locks such as rod locks, bolt seals, cable ties, etc., this requires destruction of the lock 42.

The cargo control system of the present invention provides secured transportation of cargo, as described above, by construction of a secured divider 12 in a 12 inches×8 feet boards or pieces of lumber; one 1 inch×8 inches×8 feet board or piece of lumber; four 4-inch self-tapping screws; two 4 feet×8 feet×5⁄8 inch pieces of plywood or chipboard, preferably interlocking; two 4-inch common nails; two rod locks having unique serial numbers; one notification sticker for recordation of the serial numbers; and three deck bars.

The invention has been described with specific materials of construction and specific dimensions. Any conventional material or dimensions of the material may be used without departing from the spirit and scope of the invention. Also, the container 12 has been described with the only access to the first, secured compartment 14 being by removal of the sealed divider 12. In another embodiment, access to the first compartment 14 is also available through a door or other portal in the first wall 22 or the second wall 24, in addition to removal of the sealed divider 12. In this case, the door or other portal must also be secured by one or more locks 42 to prevent unauthorized access to the secured cargo 28.

While the present invention has been illustrated by the above description of embodiments, and while the embodiments have been described in some detail, it is not the intention of the applicants to restrict or in any way limit the scope of the invention to such detail. Additional advantages and modifications will readily appear to those skilled in the art. Therefore, the invention in its broader aspects is not limited to the specific details, representative apparatus and methods, and illustrative examples shown and described.

Accordingly, departures may be made from such details without departing from the spirit or scope of the applicants' general or inventive concept.

We claim:

1. A container for transporting cargo in a secured manner, comprising:

a. a first wall, a second wall, a top, and a bottom;

b. a temporary divider selectively located in the container for separating the container into at least a first compartment and a second compartment, the temporary divider comprising:

i. a bulkhead configured to extend substantially from the first wall to the second wall and to the container top;

ii. at least one first bar removeably attached to and extending from the first wall to the second wall on a first side of the bulkhead; and iii. at least one second bar removeably attached to and extending from the first wall to the second wall on a second side of the bulkhead, opposite the first side of the bulkhead; and c. at least one lock for securing the temporary divider against unauthorized removal wherein access to the cargo in the first compartment is prevented without first removing the at least one lock and the temporary divider, while access to cargo in the second compartment is unaffected by the at least one lock and the temporary divider.

2. The container of claim 1, wherein the temporary divider further comprises a base comprising a groove configured to receive the bulkhead, the base capable of resting on the bottom of the container.

3. The container of claim 1, wherein the at least one lock cooperates with the at least one second bar to secure the temporary divider against unauthorized removal.

4. A secured divider for dividing a cargo container having a first wall, a second wall, a top, and a bottom into a secured compartment and an unsecured compartment, comprising:

a. a bulkhead configured to extend substantially from the first wall to the second wall and to the container top;

b. at least one first bar removeably attached to and extending from the first wall to the second wall on a first side of the bulkhead;

c. at least one second bar removeably attached to and extending from the first wall to the second wall on a second side of the bulkhead, opposite the first side of the bulkhead; and d. at least one lock disposed to cooperate with the second bar to prevent removal of the second bar, wherein placement of the divider in the cargo container with the lock locked prevents further access to the secured compartment, without affecting access to the unsecured compartment, and wherein the bulkhead cannot be removed, and access cannot be provided to the secured compartment, without removal of the second bar.

5. The divider of claim 4, wherein the container is a deck trailer for use with a tractor-trailer vehicle, the deck trailer comprising at least one horizontal rail with spaced slots disposed on the first wall and on the second wall.

6. The divider of claim 5, wherein the bars comprise deck bars configured to interlock with the rails.

7. The divider of claim 6, wherein the lock comprises two rod locks, the rod locks placed in cooperation with the second bar near where the second bar attaches to the first wall and near where the second bar attaches to the second wall.

8. The divider of claim 4, further comprising a base with a groove configured to receive the bulkhead, the base capable of resting on the bottom of the container.

9. The divider of claim 8, wherein the base comprises a board with a first width fastened between two boards with a second width to create the groove, the second width being greater than the first width.

10. The divider of claim 8, wherein the bulkhead is disposed within the groove and is secured to the base.

11. The divider of claim 4, wherein the bulkhead comprises two plywood sheets capable of being disposed side by side.

12. The divider of claim 4, wherein the lock comprises at least one rod lock, cable tie, cable seal, bolt seal, lead and wire seal, or combination thereof.

13. A method for constructing a secured divider in a container having a first wall, a second wall, a top and a bottom, comprising a. assembling a base capable of receiving a bulkhead;

b. attaching at least one first bar to the first wall and to the second wall;

c. placing the base on the container bottom near a vertical plane in which the first bar is disposed;

d. inserting the bulkhead into the base such that the first bar is near a first side of the bulkhead;

e. attaching at least one second bar to the first wall and to the second wall such that the second bar is near a second side of the bulkhead, opposite the first side of the bulkhead; and f. locking the second bar with at least one lock so that removal of the second bar may only be accomplished by removal of the associated lock.

14. A cargo control system for transporting cargo, comprising a. a container;

b. material for constructing a removable bulkhead to be placed within the container to define a compartment having a volume smaller than the volume of the container;

c. at least one lock for locking the removable bulkhead;

d. means for identifying the at least one lock; and e. means for verifying that the at least one lock has not been unlocked, removed, or breached during transport of the container;

wherein the means for identifying the at least one lock comprises a serial number associated with the at least one lock, and the means for verifying comprises a notification capable of being affixed to the bulkhead and on which can be recorded the serial number associated with the at least one lock.

* * * * *